(12) United States Patent
Nariyuki et al.

(10) Patent No.: US 8,193,510 B2
(45) Date of Patent: Jun. 5, 2012

(54) RADIATION DETECTOR (75) Inventors: Fumito Nariyuki, Kanagawa (JP);
Yoshihiro Okada, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 136 days.

(21) Appl. No.: 12/729,257

(22) Filed: Mar. 23, 2010

(65) Prior Publication Data
US 2010/0243909 A1    Sep. 30, 2010

(30) Foreign Application Priority Data
Mar. 31, 2009    (JP) ................................ 2009-087827

(51) Int. Cl.
*H01L 25/00*    (2006.01)
(52) U.S. Cl. ................................................. 250/370.11
(58) Field of Classification Search ...... 250/370.01–370.15; 378/98.8
See application file for complete search history.

(56) References Cited

U.S. PATENT DOCUMENTS

| 4,939,792 A * | 7/1990 | Urbish et al. ................ 455/347 |
| 4,998,688 A * | 3/1991 | Longerich et al. ........... 244/3.16 |
| 2006/0038132 A1* | 2/2006 | Hayashida ............... 250/370.11 |

FOREIGN PATENT DOCUMENTS
JP    2001-346788 A    12/2001
* cited by examiner

*Primary Examiner* — Kiho Kim
(74) *Attorney, Agent, or Firm* — SOLARIS Intellectual Property Group, PLLC (57) ABSTRACT

The present invention provides a radiation detector with improved workability in manufacturing processes and maintenance processes. Namely, a first housing and a second housing can be opened, to allow accessing of a TFT substrate and a radiation converting layer disposed in the first housing, and to allow accessing of a circuit substrate disposed in the second housing. Accordingly, higher workability can be achieved in manufacturing processes such as connecting of switching elements of the TFT substrate and the circuit substrate, and in maintenance processes of the TFT substrate and the circuit substrate.

5 Claims, 7 Drawing Sheets

RADIATION DETECTOR

CROSS-REFERENCE TO RELATED APPLICATION

This application claims priority under 35 USC 119 from Japanese Patent Application No. 2009-087827, filed on Mar. 31, 2009 the disclosure of which is incorporated by reference herein.

BACKGROUND OF THE INVENTION

1. Field of the Invention

The present invention relates to a radiation detector that detects radiation.

2. Description of the Related Art

As radiation detectors for detecting radiation, radiation detecting panels using TFTs have been known. In the radiation detecting panel using TFTs, a scintillator layer that produce fluorescence due to irradiation of radiation thereon, or a photoconductive layer that generates charges due to irradiation of radiation thereon, is formed on a TFT substrate in which the TFTs are formed.

The TFT substrate having the scintillator layer or the photoconductive layer formed thereon is housed in a housing of the radiation detecting panel. As an example of a configuration that contains a TFT substrate in a housing, there has been a configuration in which the TFT substrate having a scintillator layer is attached to a base, and the base is disposed in the housing (see Japanese Patent Application Laid-Open (JP-A) No. 2001-346788).

Note that, portable radiation detecting panels are required to be light as much as possible. To realize this requirement, for example, a configuration where the base is removed, and the other components such as the TFT substrate attached to the housing, may be proposed.

However, in the above configuration, the workability of the manufacturing processes and the maintenance processes may be poor, since the components such as the TFT substrate are attached to the housing.

SUMMARY OF THE INVENTION

The present invention provides a radiation detector with improved workability in the manufacturing processes and the maintenance processes.

A first aspect of the present invention is a radiation detector, including: a TFT substrate including switching elements configured by TFTs formed on an insulating substrate; a radiation converting layer disposed on the TFT substrate, that converts radiation into charges that are read by the switching element or that converts radiation into light to be converted into charges that are read by the switching element; a circuit substrate connected to the switching element; a first housing including a first containing space that contains the TFT substrate and the radiation converting layer; a second housing disposed facing the first housing and separated from the first housing, including a second containing space that contains the circuit substrate; and a joining portion that joins the first housing and the second housing, so that the first containing space and the second containing space are openable.

With this configuration, the radiation converting layer converts the radiation into charges or converts radiation into light. When the radiation is converted into light, the light is then converted into charges. The converted charges are read by the switching element of the TFT substrate, and the radiation is detected.

In the configuration of the first aspect of the present invention, the first containing space and the second containing space can be opened, and therefore access to the TFT substrate and the radiation converting layer housed in the first housing, and to the circuit substrate housed in the second housing, is possible.

Accordingly, the radiation detector of the present invention can provide higher workability in the manufacturing processes, such as connecting the switching element of the TFT substrate to the circuit substrate, and in the maintenance processes of the TFT substrate and the circuit substrate.

In a second aspect of the present invention, in the first aspect, may further include a connection terminal that is disposed at one side of peripheral portion of the TFT substrate, and that connects the switching element and the circuit substrate.

In the configuration of the second aspect of the invention, the connection terminal for connecting the switching element of the TFT substrate and the circuit substrate, is disposed at one peripheral portion of the TFT substrate in a plan view. Accordingly, in the configuration of the second aspect of the invention, wires of the connection circuit that connects the connection terminal and the circuit substrate can be gathered. With this configuration of the second aspect of the invention, the connection circuit does not interrupt when opening the housing and performing maintenance processes.

In a third aspect of the present invention, in the second aspect, may further include a connection circuit that wires the second housing and the first housing at the joining portion side, and that connects the connection terminal and the circuit substrate.

In the configuration of the third aspect of the present invention, the connection circuit that connects the connection terminal and the circuit substrate is wired to the second housing from the first housing on the joining portion side. Accordingly, in the configuration of the third aspect of the invention, the connection circuit does not interrupt when opening the housing and performing maintenance processes.

In a fourth aspect of the present invention, in the first aspect, the radiation may be irradiated to the radiation converting layer through the first housing and the TFT substrate.

In the configuration of the fourth aspect of the present invention, the TFT substrate and the radiation converting layer are disposed in this order on the first housing. Accordingly, in the fourth aspect of the present invention, the base can be removed, and the TFT substrate can be attached directly to the housing.

According to the above described aspects, the present invention provides a radiation detector with improved workability in the manufacturing processes and in the maintenance processes.

BRIEF DESCRIPTION OF THE DRAWINGS

Exemplary embodiment of the present invention will be described in detail based on the following figures, wherein.

DETAILED DESCRIPTION OF THE INVENTION

Hereinafter, description of exemplary embodiments of the present invention will be described with reference to the drawings.

[First Exemplary Embodiment]

Figure 1:
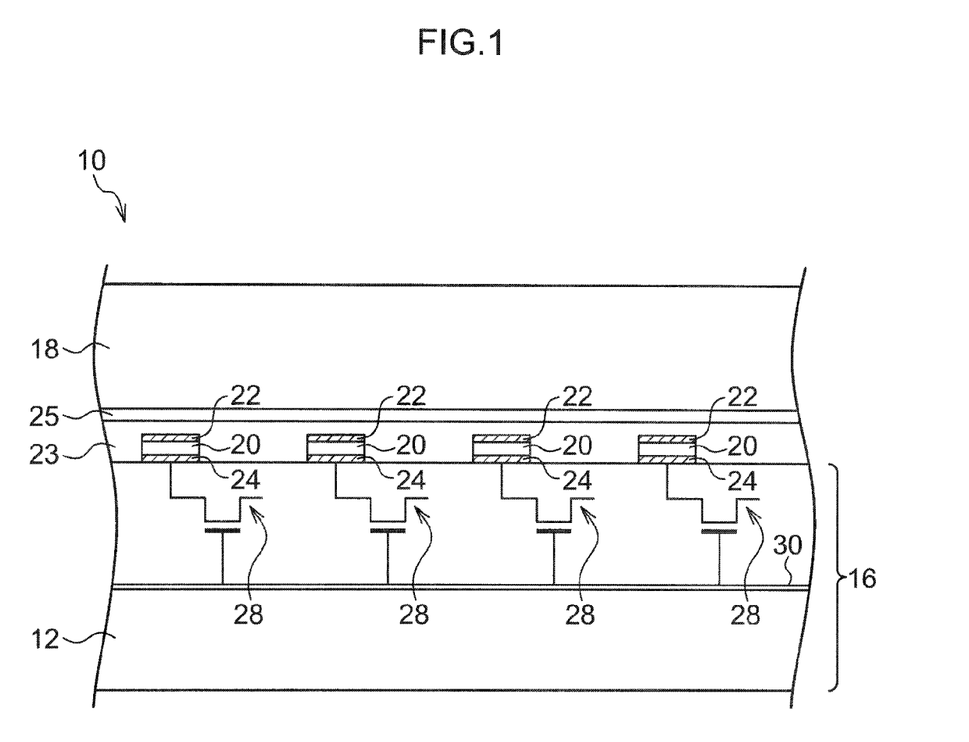
FIG. 1 is a schematic side view showing the configuration of an indirect-conversion-type radiation detector.
Figure 2:
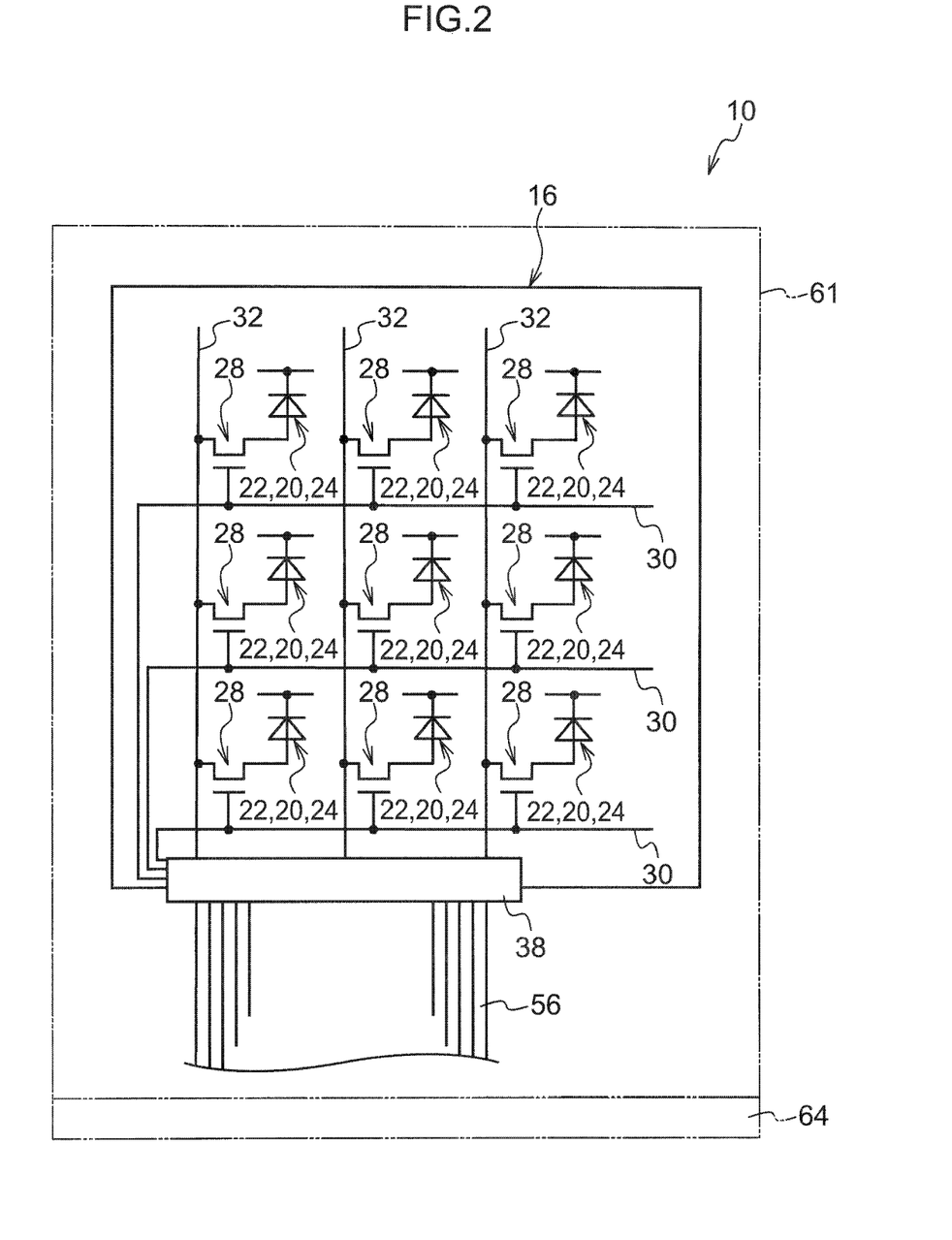
FIG. 2 is a schematic view showing, from the first housing side, the configuration of a radiation detector according to a first exemplary embodiment.
Figure 3:
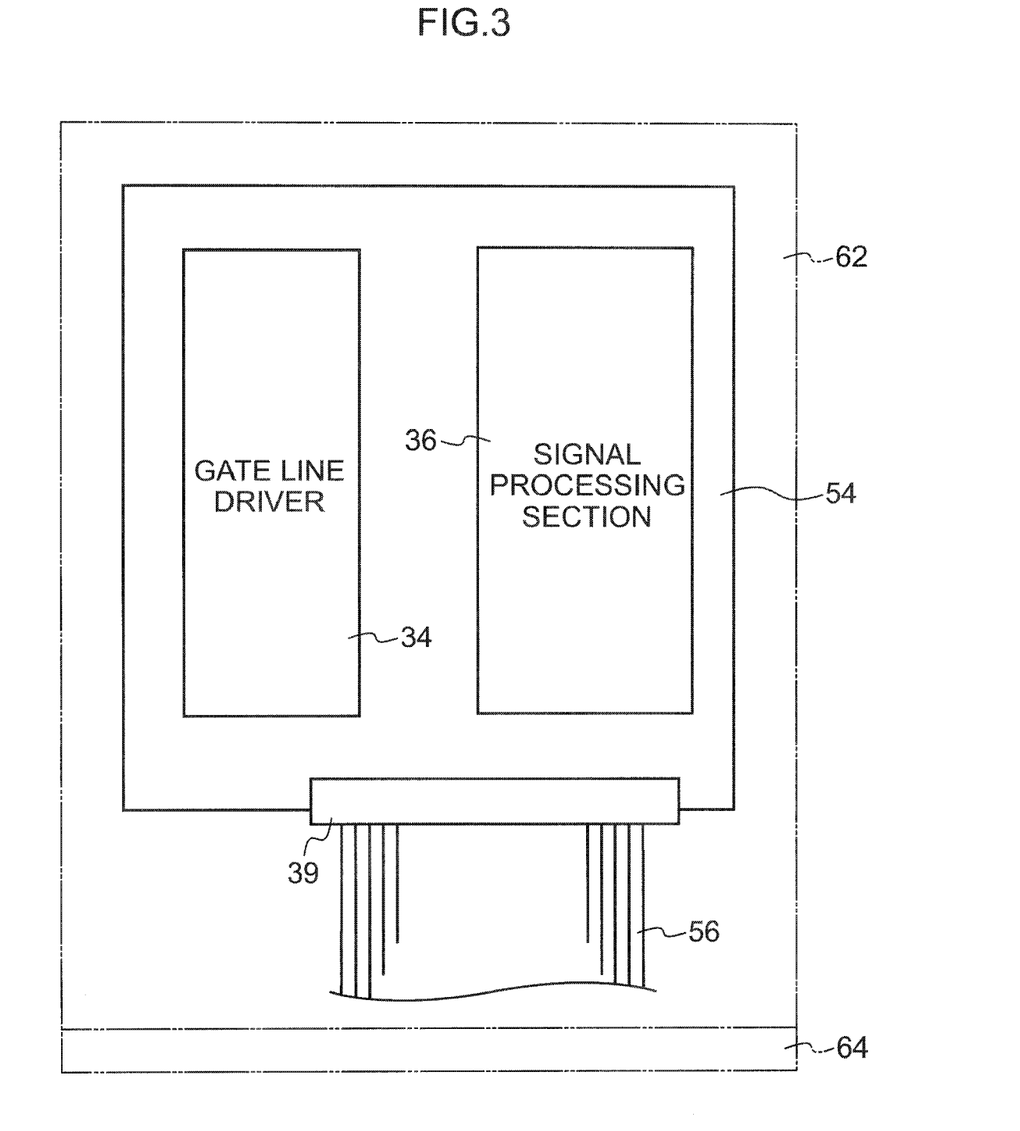
FIG. 3 is a schematic view showing, from the second housing side, the configuration of the radiation detector according to the first exemplary embodiment.
Figure 4:
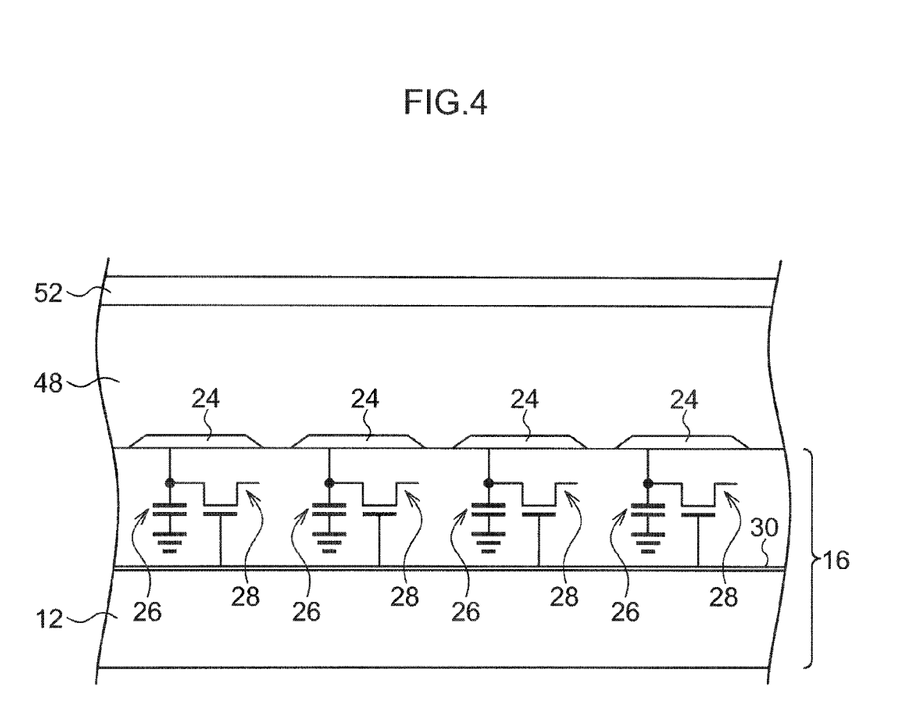
FIG. 4 is a schematic side view showing the configuration of a direct-conversion-type radiation detector.

Here, the configuration of a radiation detector according to a first exemplary embodiment will be described. Note that, FIG. 1 is a schematic side view showing the configuration of an indirect-conversion-type radiation detector. Further, FIG. 2 is a schematic view showing, from the first housing side, the configuration of a radiation detector according to a first exemplary embodiment. Further, FIG. 3 is a schematic view showing, from the second housing side, the configuration of the radiation detector according to the first exemplary embodiment. Furthermore, FIG. 4 is a schematic side view showing the configuration of a direct-conversion-type radiation detector.

The radiation detector 10 includes a TFT substrate 16, as shown in FIG. 1. In the TFT substrate 16, switching elements 28 configured by thin film transistors (TFTs) are formed on an insulating substrate 12.

On the TFT substrate 16, a scintillator layer 18 that converts irradiated radiation into light, is formed. Note that, the scintillator layer 18 is an example of a radiation converting layer that converts irradiated radiation.

Examples of materials used for the scintillator layer 18 are CsI:Tl and GOS($Gd_2O_2S$:Tb). Note that, the material of the scintillator layer 18 is not limited to the above materials.

The insulating substrate 12 may be, for example, a glass substrate, various kinds of a ceramic substrate, or a resin substrate. Note that, the insulating substrate 12 is not limited to the above materials.

Photoconductive layers 20 are provided between the scintillator layer 18 and the TFT substrate 16. The photoconductive layers 20 generate charges when the light, converted in the scintillator layer 18, is illuminated on the photoconductive layers 20. Bias electrodes 22 for applying bias voltage to the photoconductive layers 20 are formed on the surfaces of the photoconductive layers 20, at the side where the scintillator layer 18 is formed.

Charge collecting electrodes 24 that collect the charges generated by the photoconductive layers 20 are formed on the TFT substrate 16. In the TFT substrate 16, the charges collected by the charge collecting electrodes 24 are read by the switching elements 28.

The charge collecting electrodes 24 are arranged two-dimensionally on the TFT substrate 16. Respectively to the charge collecting electrodes 24, the switching elements 28 are also arranged two-dimensionally on the insulating substrate 12, as shown in FIG. 2.

Further, plural gate lines 30 and plural signal lines (data lines) 32 are provided on the TFT substrate 16. The gate lines 30 extend in a predetermined direction (the row direction), and switch on and off the respective switching elements 28. The signal lines (data lines) 32 extend in a direction perpendicular to the gate lines 30 (the column direction), and read charges through the switching elements 28 in an ON state.

A flattening layer 23 for flattening the top surface of the TFT substrate 16 is formed on the TFT substrate 16. An adhesive layer 25 for bonding the scintillator layer 18 to the TFT substrate 16 is formed on the flattening layer 23 between the TFT substrate 16 and the scintillator layer 18.

The TFT substrate 16 has a quadrilateral shape with four sides extending along its outer peripheral portion, in a plan view. More specifically, the TFT substrate 16 is formed in a rectangular shape.

A connection terminal 38 to which the gate lines 30 and the signal lines 32 are connected, is provided at one side of the peripheral portion of the TFT substrate 16. The plural gate lines 30 and the plural signal lines 32 are connected to the connection terminal 38. The connection terminal 38 is connected to a circuit substrate 54 via a connection circuit 56, as shown in FIG. 2 and FIG. 3. The circuit substrate 54 has a gate line driver 34 and a signal processing section 36 as external circuits.

The switching elements 28 are switched on sequentially in the row, based on receipt of signals supplied from the gate line driver 34 via the gate lines 30. The charges that are read by the switching elements 28 in the ON state, are transmitted as charge signals through the signal lines 32. Further, the transmitted charge signals are input to the signal processing section 36. The charges are read out sequentially in the row. Due thereto, the radiation detector according to the first exemplary embodiment can acquire two-dimensional radiographic images.

In the above described configuration, the gate lines 30 are provided perpendicular to the signal lines 32. However, the gate lines 30 may extend parallel to the signal lines 32, and the gate lines 30 and the signal lines 32 may be connected to a connection terminal disposed at one side of the peripheral portion of the TFT substrate 16.

The above described radiation detector 10 is of the indirect-conversion-type that converts radiation into light, and further converts the light into charges, so as to detect the radiation. However, the radiation detector 10 may be of a direct-conversion-type that converts radiation directly into charges.

In the direct-conversion-type radiation detector, a photoconductive layer 48 is formed on the TFT substrate 16 as shown in FIG. 4. Note that, the photoconductive layer 48 is an example of a radiation converting layer that converts irradiated radiation into charges.

The material of the photoconductive layer 48 may be a compound that contains at least one of the following materials as a main component, such as amorphous Se, $Bi_{12}Mo_{20}$ (M:Ti, Si, Ge), $Bi_4M_3O_{12}$ (M:Ti, Si, Ge), $Bi_2O_3$, $BiMO_4$ (M:Nb, Ta, V), $Bi_2WO_6$, $Bi_{24}B_2O_{39}$, ZnO, ZnS, ZnSe, ZnTe, $MNbO_3$ (M:Li, Na, K), PbO, $HgI_2$, $PbI_2$, CdS, CdSe, CdTe, $BiI_3$, GaAs, and the like. However, an amorphous material that has high dark resistance, excellent photoconductivity when X-rays are irradiated, and that can be formed by vacuum vapor deposition in a large-area at a low temperature, is preferred as the material of the photoconductive layer 48.

A bias electrode 52 is formed on the surface of the photoconductive layer 48. The bias electrode 52 applies a bias voltage to the photoconductive layer 48.

In the direct-conversion-type radiation detector, the charge collecting electrodes 24 are formed on the TFT substrate 16, as in the indirect-conversion-type radiation detector. The charge collecting electrodes 24 collect the charges generated in the photoconductive layer 48.

The TFT substrate 16 of the direct-conversion-type radiation detector has charge storage capacitors 26 that store the charges collected by the charge collecting electrodes 24. The charges stored in the respective charge storage capacitors 26 are read by the switching elements 28.

Figure 5:
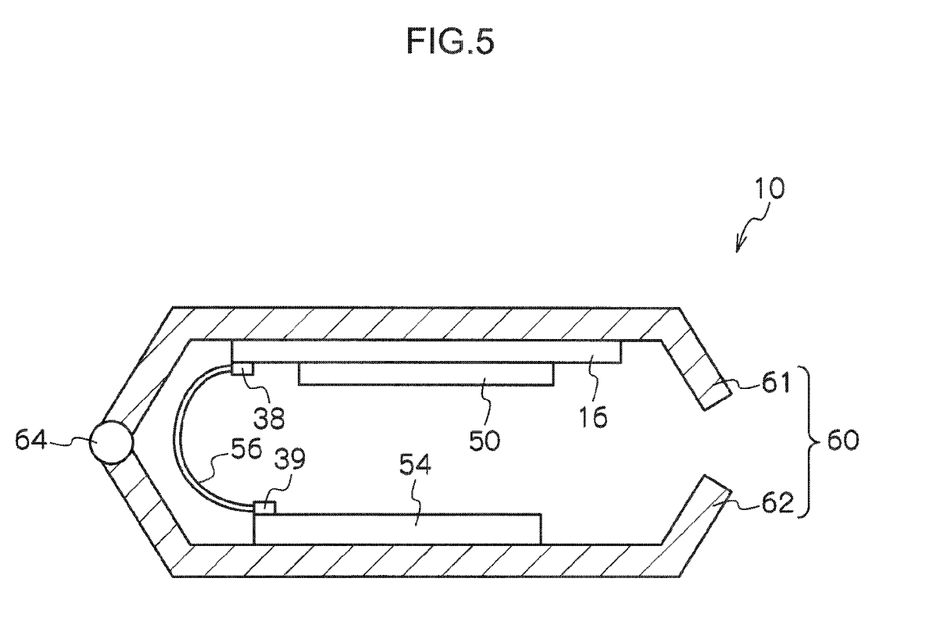
FIG. 5 is a schematic view showing the entire configuration of the radiation detector according to the first exemplary embodiment.

Next, the configuration of the housing of the radiation detector 10 is described. FIG. 5 is a schematic view showing the entire configuration of the radiation detector according to the first exemplary embodiment.

This configuration may be used in both the indirect-conversion-type radiation detector and the direct-conversion-type radiation detector. In the following description, the scintillator layer 18 of the indirect-conversion-type radiation detector and the photoconductive layer 48 of the direct-conversion-type radiation detector are explained as a radiation converting layer 50.

As shown in FIG. 5, the radiation detector 10 has a housing 60 that is divided into a first housing 61 and a second housing 62. The first housing 61 and the second housing 62 are disposed to face each other. The first housing 61 is formed with a box-like body with an opening at the side facing the second housing 62. In the first housing 61, at the side facing the second housing 62, a first containing space for housing the components is formed. Like the first housing 61, the second housing 62 is formed with a box-like body with an opening at the side facing the first housing 61. In the second housing 62, at the side facing the first housing 61, a second containing space for housing components is formed.

Figure 6:
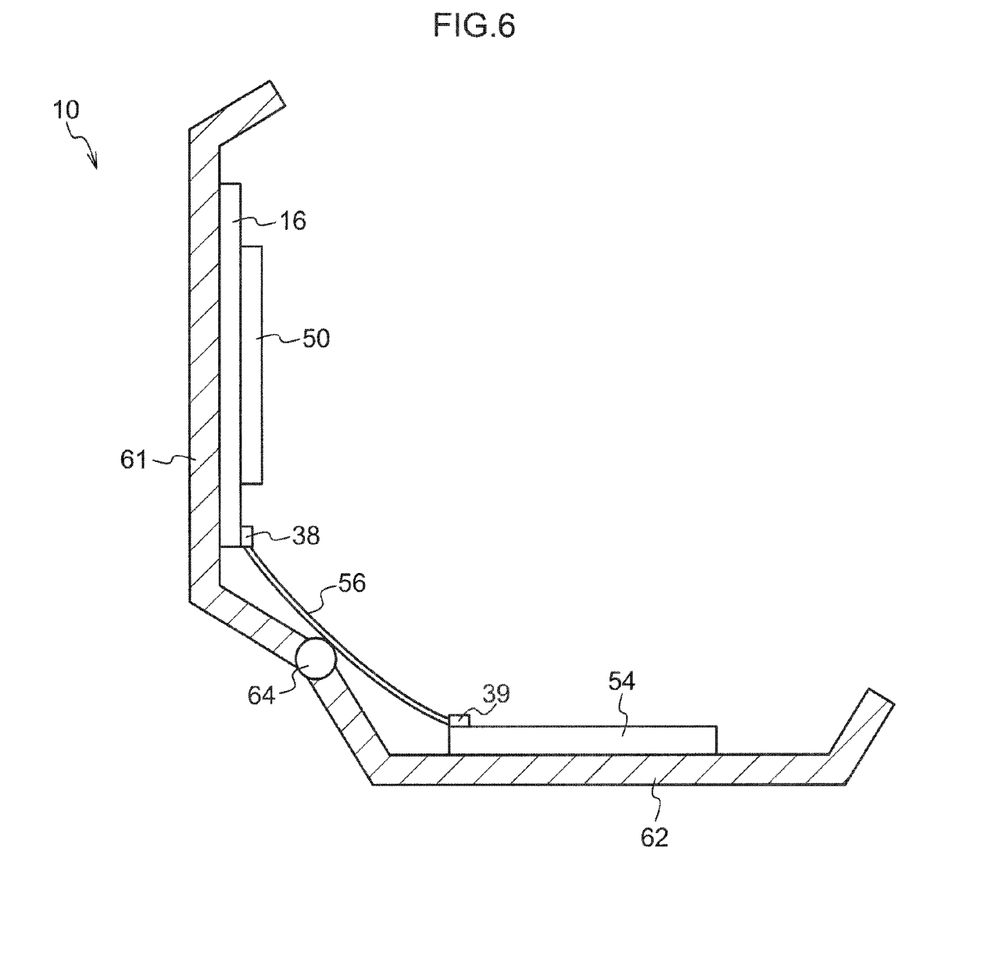
FIG. 6 is a schematic view showing the radiation detector of FIG. 5, when the housings are opened.

The first housing 61 and the second housing 62 separated from each other are joined by a hinge portion 64 as an example of a joining portion. This hinge portion 64 allows the first containing space of the first housing 61 and the second containing space of the second housing 62 to be opened. One of the first housing 61 and the second housing 62 rotates about the hinge portion 64 with respect to the other one of the first housing 61 and the second housing 62, to open the first containing space of the first housing 61 and the second containing space of the second housing 62, as shown in FIG. 6. Further, one of the first housing 61 and the second housing 62 rotates about the hinge portion 64 with respect to the other one of the first housing 61 and the second housing 62, to close the first containing space of the first housing 61 and the second containing space of the second housing 62, as shown in FIG. 5.

When the first containing space and the second containing space are closed, the second housing 62 faces the first housing 61. In this situation, the first containing space and the second containing space are closed from outside of the radiation detector 10, and is surrounded by the first housing 61 and the second housing 62.

When the first containing space and the second containing space are opened, each of the containing spaces can be accessed from the outside of the radiation detector 10.

In the first exemplary embodiment, the above described TFT substrate 16 and the radiation converting layer 50 are disposed in the first containing space of the first housing 61. Radiation from outside the first housing 61 enters the radiation converting layer 50 via the first housing 61 and the TFT substrate 16.

On the other hand, the circuit substrate 54 having the signal processing section 36 and the gate line driver 34 is disposed in the second containing space of the second housing 62.

As shown in FIG. 2, at the side of the hinge portion 64, the connection terminal 38 for connecting the circuit substrate 54 and the switching elements 28 of the TFT substrate 16 is disposed on the TFT substrate 16.

As shown in FIG. 2 and FIG. 3, at the side of the hinge portion 64, the connection circuit 56 that connects the connection terminal 38 and the circuit substrate 54 is wired to the second housing 62 from the first housing 61. Likewise, the connection terminal 39 of the circuit substrate 54 is disposed on the side of the hinge portion 64, and is connected to the connection circuit 56.

Next, the advantages of the above described exemplary embodiment will be explained.

In the first exemplary embodiment, the first containing space and the second containing space can be opened, to allow accessing of the TFT substrate 16 and the radiation converting layer 50 disposed in the first housing 61, and to allow accessing of the circuit substrate 54 disposed in the second housing 62.

The connection terminal 38 for connecting the switching elements 28 of the TFT substrate 16 to the circuit substrate 54 is disposed on one side of the TFT substrate 16. Due thereto, wires of the connection circuit 56 that connects the connection terminal 38 and the circuit substrate 54 can be gathered. With this configuration of the first exemplary embodiment, the connection circuit 56 does not interrupt when opening the first housing 61 and the second housing 62.

The connection circuit 56 is wired to the second housing 62 from the first housing 61 on the side of the hinge portion 64. Accordingly, with this configuration of the first exemplary embodiment, the connection circuit 56 does not interrupt when opening the first housing 61 and the second housing 62.

As described above, in the first exemplary embodiment, the first housing 61 and the second housing 62 can be opened. Accordingly, in the first exemplary embodiment, higher workability can achieved in the manufacture procedures, such as connecting the switching elements 28 of the TFT substrate 16 to the circuit substrate 54, and in the maintenance processes of the TFT substrate 16 and the circuit substrate 54.

In the first exemplary embodiment, the connection terminal 38 is disposed on one side of the TFT substrate 16. Due thereto, the wires of the connection circuit 56 that connects the connection terminal 38 and the circuit substrate 54 can be gathered. With this configuration of the first exemplary embodiment, the connection circuit 56 does not interrupt when in the manufacturing processes and in the maintenance processes. Accordingly, the radiation detector 10 of the first exemplary embodiment can provide higher workability.

Further, in the first exemplary embodiment, the connection circuit 56 wires the first housing 61 and the second housing 62 on the side of the hinge portion 64. Accordingly, in the first exemplary embodiment, the connection circuit 56 does not interrupt when in the manufacturing processes and in maintenance processes. Accordingly, the radiation detector 10 of the first exemplary embodiment can provide higher workability.

In the first exemplary embodiment, the radiation enters the radiation converting layer 50 through the TFT substrate 16. Therefore, the TFT substrate 16 is disposed closer to the first housing 61 (on the outer side) than the radiation converting layer 50 as shown in FIG. 5. With this configuration the TFT substrate 16 can be attached directly to the first housing 61. Therefore, the base 58 shown in FIG. 7 becomes unnecessary in the first exemplary embodiment. Accordingly, in the first exemplary embodiment, the weight of the radiation detector 10 can be reduced.

[Alternative Exemplary Embodiment]

Figure 7:
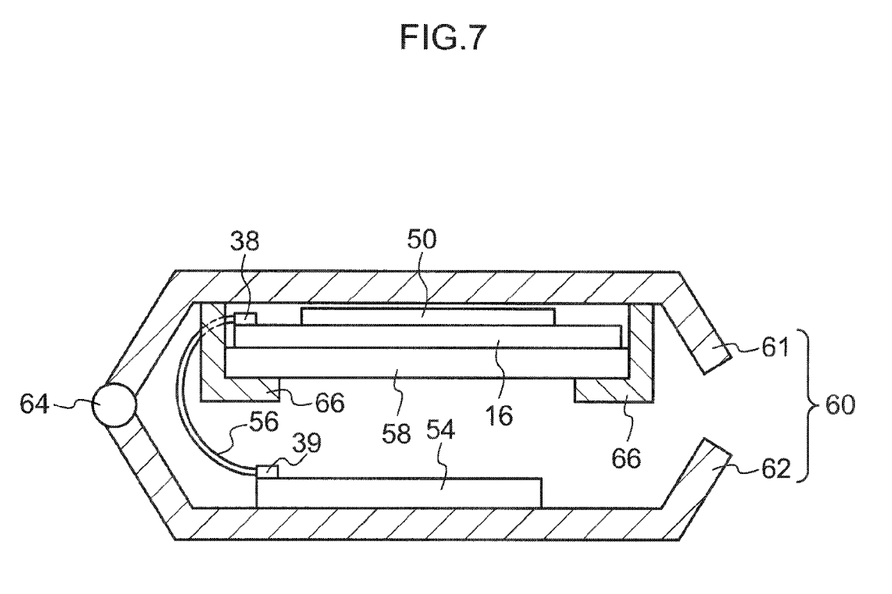
FIG. 7 is a schematic view showing the configuration of the radiation detector according to an alternative exemplary embodiment, in which the radiation enters the radiation converting layer without passing through the TFT substrate.

In the configuration according to the first exemplary embodiment, radiation enters the radiation converting layer 50 through the TFT substrate 16. In an alternative exemplary embodiment, however, radiation may enter the radiation converting layer 50 without passing through the TFT substrate 16, as shown in FIG. 7. In the exemplary embodiment as shown in FIG. 7, the radiation converting layer 50 and the TFT substrate 16 are disposed in this order, when seen from the first housing 61. Further, the TFT substrate 16 is attached to a base 58. The base 58 is supported by supporting members 66 attached to the first housing 61. Note that, the other configurations of the alternative exemplary embodiment are the same as those of the first exemplary embodiment.

The invention is not limited to the above described exemplary embodiments, and various changes and modifications may be made thereto.

What is claimed is:

1. A radiation detector comprising:
  a TFT substrate including switching elements configured by TFTs formed on an insulating substrate;
  a radiation converting layer disposed on the TFT substrate, that converts radiation into charges that are read by the switching element or that converts radiation into light to be converted into charges that are read by the switching element;
  a circuit substrate connected to the switching element;
  a first housing including a first containing space that contains the TFT substrate and the radiation converting layer;
  a second housing disposed facing the first housing and separated from the first housing, including a second containing space that contains the circuit substrate; and
  a joining portion that joins the first housing and the second housing, so that the first containing space and the second containing space are openable.

2. The radiation detector of claim 1, further comprising a connection terminal that is disposed at one side of peripheral portion of the TFT substrate, and that connects the switching element and the circuit substrate.

3. The radiation detector of claim 2, further comprising a connection circuit that wires the second housing and the first housing at the joining portion side, and that connects the connection terminal and the circuit substrate.

4. The radiation detector of claim 1, wherein radiation is irradiated to the radiation converting layer through the first housing and the TFT substrate.

5. The radiation detector of claim 1, wherein the joining portion joins the first housing and the second housing so that the first containing space and the second containing space can be accessed from the outside of the radiation detector when the first containing space and the second containing space are opened.

* * * * *